United States Patent
Becker et al.

(10) Patent No.: US 8,020,529 B2
(45) Date of Patent: Sep. 20, 2011

(54) PISTON PIN WITH SLIDE LAYER FOR CONNECTING ROD EYE FOR INTERNAL COMBUSTION ENGINES

(75) Inventors: Dirk Becker, Alchwald (DE); Marcus Brand, Karlsruhe (DE); Patrick Izquierdo, Ulm (DE); Wolfgang Pellkofer, Ulm (DE); Christian Russer, Ulm (DE)

(73) Assignee: Daimler AG, Stuttgart (DE)

( * ) Notice: Subject to any disclaimer, the term of this patent is extended or adjusted under 35 U.S.C. 154(b) by 853 days.

(21) Appl. No.: 11/679,506

(22) Filed: Feb. 27, 2007

(65) Prior Publication Data
US 2007/0199442 A1     Aug. 30, 2007

(30) Foreign Application Priority Data
Feb. 27, 2006   (DE) .......................... 10 2006 008 910

(51) Int. Cl.
F02F 3/10   (2006.01)
B23P 15/00  (2006.01)
F16J 1/16   (2006.01)

(52) U.S. Cl. ........................... 123/193.6; 92/223; 92/187
(58) Field of Classification Search .................... 92/223, 92/187; 123/193.6
See application file for complete search history.

(56) References Cited

U.S. PATENT DOCUMENTS

| 4,579,712 A * | 4/1986 | Mori ................................... 419/9 |
| 5,080,056 A * | 1/1992 | Kramer et al. ............. 123/193.4 |
| 6,139,191 A | 10/2000 | Andler et al. |
| 6,557,457 B1 * | 5/2003 | Hart et al. ........................ 92/223 |
| 6,560,869 B1 | 5/2003 | Schlegel et al. |
| 6,602,829 B1 | 8/2003 | Füsser |
| 6,923,153 B2 * | 8/2005 | Rein et al. ................... 123/193.6 |
| 2005/0016489 A1 * | 1/2005 | Endicott et al. ............ 123/193.2 |
| 2005/0061291 A1 * | 3/2005 | Nishimura et al. ........ 123/197.4 |
| 2006/0000351 A1 * | 1/2006 | Schenkel et al. ................ 92/223 |
| 2006/0027206 A1 * | 2/2006 | Boehm et al. .............. 123/193.1 |

FOREIGN PATENT DOCUMENTS

| DE | 1038834 | 9/1958 |
| DE | 197 31 625 A1 | 9/1998 |
| DE | 198 24 308 C1 | 9/1999 |
| DE | 198 22 901 C2 | 11/1999 |
| DE | 198 22 932 C2 | 11/1999 |
| DE | 198 22 934 C2 | 11/1999 |
| DE | 100 35 032 C2 | 2/2002 |
| DE | 10 2004 018 921 A1 | 11/2005 |
| EP | 001061153 A * | 12/2000 |
| JP | 62017465 A * | 7/1985 |

* cited by examiner

*Primary Examiner* — M. McMahon
(74) *Attorney, Agent, or Firm* — Patent Central LLC; Stephan A. Pendorf

(57) ABSTRACT

Piston pin for a connecting rod in a reciprocating internal combustion engine, wherein the piston pin carries at least in the area of the running surface a thermal sprayed slide layer of a metallic bearing material or slide bearing material, as well as reciprocating internal combustion engine with a connecting rod with small and with large connecting rod eye, wherein at least the running surface of one of the piston pins is formed of a thermal sprayed slide layer of a metallic bearing material, which exhibits a lower hardness than the running surface of the corresponding connecting rod eye and process for manufacturing a described piston pin with the steps of a extrusion molding or machining a piston pin preform, introduction of a recess in the area which will later become the running surface, roughening the outer surface in the area of the recess, application of a coating of a bearing material by a thermal spray process.

15 Claims, 1 Drawing Sheet

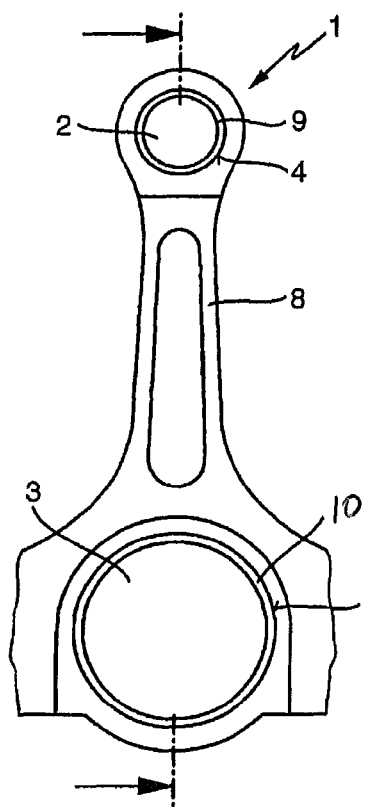
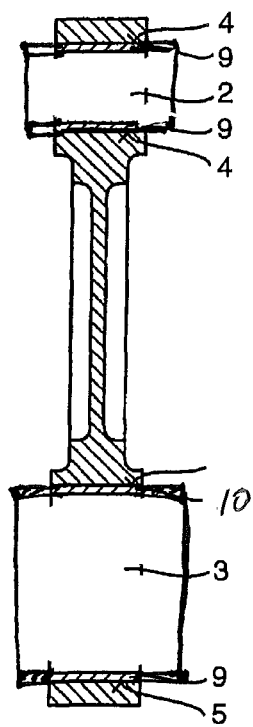
Fig. 1        Fig. 2
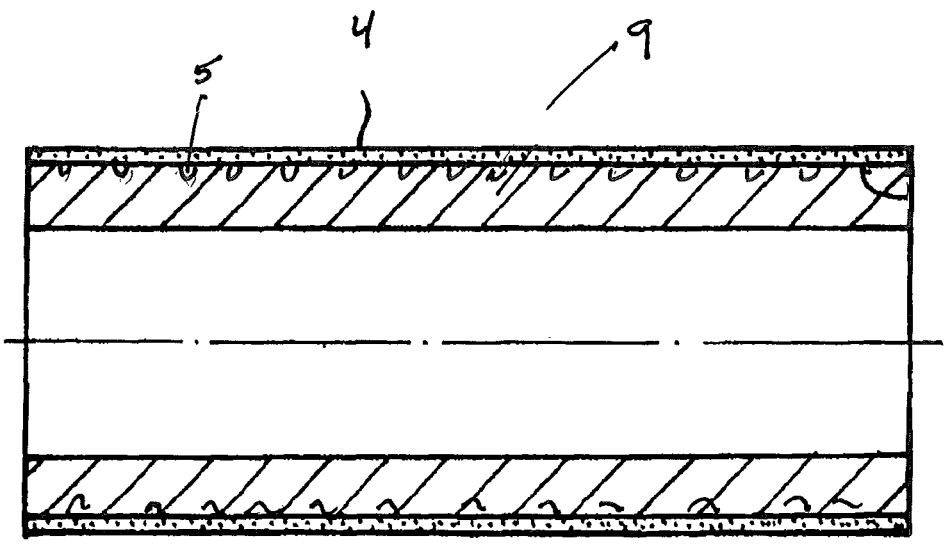
Fig. 3

PISTON PIN WITH SLIDE LAYER FOR CONNECTING ROD EYE FOR INTERNAL COMBUSTION ENGINES

BACKGROUND OF THE INVENTION

The invention concerns a piston pin for a connecting rod in a piston driven internal combustion engine and the design of the friction pairing of the running surfaces of the piston pin and the corresponding connecting rod eye in internal combustion engines as well as a processes for manufacturing piston pins provided with slide layers.

With the development of new generations of engines for motor vehicles, the requirements of the materials employed in the drive aggregate continues to increase. The development of bearings of the drive aggregate, in particular the piston bearings, has not kept pace with the evolving higher mechanical loads, in particular in the long term aspect. The manufacture of suitable piston bearings is as a rule a laborious process.

From DE 19822934 C2 or DE 19822901 C2 a process for application of an external and adhering lubricant layer upon an exposed and tribologically challenged surface of an object is known, wherein the lubricant layer exhibits boric acid ($H_3BO_3$) at least under conditions of load. The lubricant layer can also be employed for a connecting rod or piston pin. This type of coating is described in DE 19822932 C1, in which the surface of a connecting rod is coated.

Lubricant coatings have in general the disadvantage, that they wear away with time and lose their effectiveness.

In the manufacture of connecting rods in internal combustion engines it is conventional to provide the connecting rod eyes with slide bearings. Therein the connecting rod eye is as a rule provided with a recessed or seated bearing shell. Recently it has been attempted to replace this shell with slide bearing layers on the inside of the connecting rod.

From DE 19731625 A1 processes are known, for spraying the bearing layer directly on the connecting rod eye by thermal spraying of a bearing material.

Lately slide bearings are frequently formed comprising Al/Cu-alloys, frequently Sn- or Zn-alloy components. From DE 10035032 A1 a process for manufacture of a connecting rod with a bearing layer is known, wherein the bearing layer is applied preferably by means of thermal spray processes, in particular plasma spraying or arc wire spraying and preferably is comprised of Al/Cu-alloys or Cu/(Zn, Al, Sn)-alloys.

DE 19824308 C1 discloses a slide bearing shell with a slide layer applied by electron beam vapor deposition comprising a bonding material of a matrix phase, preferably of aluminum, and a dispersed phase, preferably of Sn, Pb, Bi and/or Sb.

SUMMARY OF THE INVENTION

It is the task of the invention to provide an improved and economical friction bearing for a connecting rod and the pin bolt supported therein, as well as a suitable manufacturing process.

The task is inventively solved by a piston pin for a connecting rod in internal combustion reciprocating engines in which the piston pin carries, at least in the area of the running surface, a thermal sprayed slide layer of a metallic bearing material or slide bearing material, as well as by a internal combustion reciprocating engine with at least one friction pair comprising connecting rod eye and piston pin wherein the running surface of this piston pin is formed of a thermal sprayed slide layer of a metallic bearing material, which exhibits a lower hardness than the running surface of the corresponding connecting rod eye, with the characteristics of claim 6, as well as by a process for manufacture of a piston pin for a connecting rod of a reciprocating internal combustion engine, including the steps of impact extrusion or machining a piston pin preform, introducing a recess in the area to be subsequently provided with a running surface, roughening the surface in the area of the recess, and applying a coating of a bearing material by a thermal spray process.

BRIEF DESCRIPTION OF THE DRAWINGS

Other objects and features of the present invention will become apparent from the following detailed description considered in connection with the accompanying drawings, wherein similar reference characters denote similar elements throughout the several views:

FIG. 1 shows a front view of a connecting rod;

FIG. 2 shows a side section through the connecting rod; and

FIG. 3 shows a piston pin according to an embodiment of the invention.

DETAILED DESCRIPTION OF THE INVENTION

The connecting rod 1, shown as an example according to FIGS. 1 and 2, has a small connecting rod end 2 having a piston pin 9 provided with a thermal sprayed slide layer of a metallic bearing material or slide bearing material 4, a connecting rod shaft 8, and a large connecting rod end 3.

In a first aspect of the invention it is therewith envisioned, that the piston pin as shown in FIG. 3 is equipped with a slide bearing layer. At least in the area of the running surface this is, in accordance with the invention, a slide layer of a metallic bearing material or slide bearing material 4 applied by a thermal spray process.

The layer on the piston pin is so designed, that a specialized slide layer or, as the case may be, a specialized or separate slide bearing shell in the corresponding connecting rod eye, is no longer absolutely necessary. By dispensing with the bearing housing additional construction space becomes available in the joint between connecting rod and piston pin. This construction space can be used to increase the component rigidity-stiffness of the connecting rod and/or the piston pin. If the increase in the component rigidity or stiffness is not necessary, then dispensing with the bearing box leads directly to reduction in the inertial mass of the crankshaft drive.

This approach has the advantage, that the elaborate internal coating of the slide surface of the connecting rod or the insertion of a slide bearing shell into the connecting rod eye can be omitted. Rather, it is the essentially easier to work the outer surface of the piston pin which is to be provided with the slide layer necessary for the friction pairing.

As slide layer very diverse metallic materials can be employed, which in accordance with the invention are applied as thermal sprayed layers. The processes preferably employed for production of thermal sprayed layers in accordance with the invention include arc wire spraying, plasma spraying or flame or high speed flame spraying. The thermal spray processes are characterized by good adhesion to the substrate, high application rate and high variability of the deposited layer compositions.

While previously frequently Cu-based Pb-containing alloys were employed as slide bearing materials, for environmental reasons these are increasingly replaced today with Pb-free alloys. Generic slide bearing metals or, as the case may be, slide bearing materials, are frequently comprised of Al/Cu-alloys, in particular Sn- or Zn-alloy components.

The suitable metallic bearing materials or slide bearing materials include most of the conventional slide bearing materials, which can be deposited by thermal spraying as layers.

The harder metallic bearing materials are in particular selected from one of the following alloy types: brass, for example CuZn31Si1, Al-bronze, for example CuAl14, 8Fe4, 5Mn2Co2, Al/Cu-alloys, Zn-based bronze and/or Sn-based bronze. In principle however bronzes based on Pb can also be used.

The softer metallic bearing materials are in particular selected from one of the following alloy types: bronze, for example CuSn6Ag1, white alloy (lead-base babbitt) based on Zn, Al/Sn-alloys and/or red brass or red bronze. In principal white alloy based on Pb, bronze based on Pb, bronze based on PbSn and/or PbSn-alloys can be used.

The inventive slide bearing materials include also the above mentioned metallic bearing materials with nonmetallic components, in particular ceramic additives. These can be for example carbon materials (graphite), boronitride, molybdenum sulfide or other solid lubricants.

It is particularly preferred when the thermally deposited metallic bearing material is a Cu/Sn or Cu/Zn-alloy.

Yet another preferred metallic bearing material is formed of a Al/Cu/Bi-alloy. A particularly suited bearing composition is in this case a Sn- and Pb-free Al/Cu-alloy with Bi-components in the range of 10 to 40 wt. % and 0.1 to 5 wt. % Cu.

Preferably the piston pin exhibits pockets 5 or chambers in the area of the running surface, which are filled with the slide bearing material. This has the advantage, that the comparatively soft slide bearing material is bordered on the sides by the hard and rigid material of the piston pin. The piston pin is formed as a rule of steel or hardened steel.

This local coating does not change the tribologic system piston-piston pin.

Depending upon design of the friction pairing, it can also be useful that the total cylindrical surface of the piston pin is coated with slide bearing material.

The thickness of the thermal sprayed slide layer is comparable with the conventional dimensions of the slide bearings or slide shells in connecting rod eyes. Preferably the thickness of the slide layer is 1 to 10% of the diameter of the piston pin.

A further aspect of the invention concerns the reciprocating piston internal combustion engine with at least 1 friction pairing of connecting rod eye and a piston pin provided with thermal sprayed slide layer. In this embodiment it is of particular significance that the metallic bearing material or as the case may be slide bearing material exhibits a lower hardness than the running surface of the corresponding connecting rod eye. The piston pin thus represents the softer friction partner of the friction pairing.

While the thermal spray layer of the piston pin is comprised of the above illustrated metallic bearing materials or slide bearing materials, the corresponding running surface of the connecting rod preferably has a surface of steel or hardened steel.

In a connecting rod of the internal combustion engine the running surfaces of the two connecting rod eyes can be the same or different in form.

In a first embodiment the smaller connecting rod eye exhibits no special slide surface and no bearing shell, while the corresponding piston pin of the smaller connecting rod eye has a thermal sprayed slide layer. The larger connecting rod eye in contrast exhibits a slide bearing layer or bearing shell. The corresponding piston pin is thus preferably characterized by a thermal sprayed slide layer. Since it is frequently necessary for construction purposes, in the assembly of the connecting rod to the crankshaft, that the large connecting rod eye must be opened (cracked), in this case the application of a slide layer or bearing shells in the large connecting rod eye is less intrusive or problematic than in the case of the small connecting rod eye.

In a further embodiment the small and large connecting rod eyes exhibit no special slide layer and no bearing shells, while both corresponding pins exhibit a thermal sprayed slide layer. The crank pin corresponding to the large connecting rod eye is designed in an internal combustion engine as crank pin 10 for the crankshaft. The slide layers can differ with respect to their composition and design. The thermal spray process makes it possible likewise to targetedly coat, and to coat limited to the running surface, the geometrically more complex crank pin of the larger connecting rod eye. In a preferred embodiment all running surfaces of the connecting rod eyes would correspond to the piston pin provided with slide layer, and exhibit neither bearing shell nor slide coating.

A further inventive embodiment concerns a preferred process for manufacture of piston pins for a connecting rod in a reciprocating internal combustion engine.

The process for manufacture of a piston pin for a connecting rod in a reciprocating internal combustion engine includes at least the following essential steps:
 a) extrusion molding or machining a piston pin preform,
 b) introducing a recess (forming a chamber or pocket) in the area of the later running surface,
 c) roughening the surface in the area of the recess, and
 d) applying a coating of a bearing material by a thermal spray process.

In a preferred embodiment a steel pin is utilized for the piston pin and this is subjected to a hardening treatment between steps b) and c) or steps c) and d). It is particularly preferred when the recess in the area of the running surface or, as the case may be, the chambering, as well as the roughening of the surface is introduced in the unhardened steel. The recess in the area of the running surface is preferably introduced into a depth of 1 to 10% of the diameter of the piston pin.

Depending upon the type of surface treatment, in particular the fineness of the surface contours, it can however also be advantageous to first carry out the hardening and only then to roughen the outer surface. Thereby it can be prevented that the surface structure is disadvantageously changed or modified by the thermal treatment, for example scaling, or by quenching in a cooling medium (for example oil) which medium remains adhered in the microscopic recesses and grooves.

Particularly suited processes for roughening the outer surface include bjet processes, in particular high pressure water jet (HPWJ) with and without abrasive particles (abrasive HPWJ). Advantageous is the alternating treatment with abrasive HPWJ and HPWJ.

Besides this, also electronic processes, such as for example ECM-processes (electrochemical machining) can be successfully employed, in order in particular to produce very reproducible or even surface structures or as the case may be recesses.

As a rule it is necessary, after the thermal spraying (step d) to carry out a smoothing or flattening or machining follow-up treatment. This is advantageous at least for the running surface, since thereby the necessary fitting precision in the friction partners can be achieved.

Particularly suited thermal spray processes include arc wire spraying (LDS), plasma spraying, or flame or high speed flame spraying. These processes are characterized by high rates of deposition. The depositing of in part molten metal ensures a good adhesion to the roughened substrate. Comparatively thin layers can also be provided by economically a sputtering processes.

After surface coating and a subsequent flattening or smoothing of the surface as desired of the coated piston pin, this is preferably introduced into the connecting rod eye of a reciprocating internal combustion engine, which has no slide layer or corresponding running surface. Herein this is particularly preferably the smaller connecting rod eye.

Now that the invention has been described, I Claim:

1. A piston pin for a connecting rod in a reciprocating internal combustion engine, said piston pin including a running surface,
   wherein the piston pin has provided at least in the area of the running surface a thermal sprayed slide layer of a metallic bearing material,
   wherein the piston pin exhibits pockets or chambers in the area of the running surface, which are filled with the metallic bearing material, and
   wherein the metallic bearing material is a substantially Pb free Al/Cu/Bi-alloy.

2. The piston pin according to claim 1, wherein the entire cylindrical surface of the piston pin is coated with a slide bearing material.

3. The piston pin according to claim 1, wherein the thickness of the slide layer is from 1 to 10% of the diameter of the piston pin.

4. The piston pin according to claim 1, wherein the Bi-component of the metallic bearing material is in the range of 10 to 40 wt. %.

5. The piston pin according to claim 1, wherein the Bi-component of the metallic bearing material is in the range of 10 to 40 wt. % and the Cu component of the metallic bearing material is in the range of 0.1 to 5 wt. %.

6. The piston pin according to claim 1, wherein the piston pin is formed of steel or hardened steel.

7. A reciprocating internal combustion engine with a connecting rod with small and large connecting rod eyes,
   wherein at least the running surface of a piston pin is formed of a thermal sprayed slide layer of a metallic bearing material, which exhibits a lower hardness than the running surface of the corresponding connecting rod eye,
   wherein the piston pin exhibits pockets or chambers in the area of the running surface, which are filled with the metallic bearing material, and
   wherein the metallic bearing material is a substantially Pb free Al/Cu/Bi-alloy.

8. The reciprocating internal combustion engine according to claim 7, wherein only the running surface of the connecting pin corresponding to the smaller connecting rod eye exhibits the slide layer.

9. The reciprocating internal combustion according to claim 7, wherein the running surfaces of the connecting rod eye, which correspond with the piston pin provided with the slide layer, exhibits no bearing shell or slide layer or coating.

10. The reciprocating internal combustion engine according to claim 7, wherein the running surface of the corresponding connecting rod eye is comprised of steel or hardened steel.

11. The reciprocating internal combustion engine according to claim 7, wherein the pin corresponding to the large connecting rod eye is a crank-pin for the crankshaft, and wherein this crank pin exhibits the slide layer.

12. The reciprocating internal combustion according to claim 7, wherein the Bi-component of the metallic bearing material is in the range of 10 to 40 wt. %.

13. The reciprocating internal combustion according to claim 7, wherein the Bi-component of the metallic bearing material is in the range of 10 to 40 wt. % and the Cu component of the metallic bearing material is in the range of 0.1 to 5 wt. %.

14. The reciprocating internal combustion according to claim 7, wherein the piston pin is formed of steel or hardened steel.

15. The reciprocating internal combustion according to claim 7, wherein the running surfaces of the connecting rod eye, which correspond with the piston pin provided with the slide layer, is formed of steel or hardened steel and exhibits no bearing shell or slide layer or coating.

* * * * *